(12) United States Patent
Hoshino et al.

(10) Patent No.: US 7,201,821 B2
(45) Date of Patent: Apr. 10, 2007

(54) IDENTIFYING MEDIUM AND IDENTIFYING METHOD FOR OBJECT

(75) Inventors: Hidekazu Hoshino, Yokohama (JP);
Itsuo Takeuchi, Yokohama (JP);
Mutsumi Sasaki, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 85 days.

(21) Appl. No.: 10/503,493

(22) PCT Filed: Feb. 12, 2003

(86) PCT No.: PCT/JP03/01431

§ 371 (c)(1),
(2), (4) Date: Aug. 5, 2004

(87) PCT Pub. No.: WO03/069587

PCT Pub. Date: Aug. 21, 2003

(65) Prior Publication Data

US 2005/0142337 A1    Jun. 30, 2005

(30) Foreign Application Priority Data

Feb. 12, 2002    (JP)    ............... 2002-034565

(51) Int. Cl.
*B32B 38/14* (2006.01)
*B32B 38/00* (2006.01)
*G09F 3/03* (2006.01)
*B42D 15/10* (2006.01)

(52) U.S. Cl. ............... 156/277; 283/72; 283/86; 283/90; 283/91; 283/101; 283/103; 359/2

(58) Field of Classification Search ............... 156/277
See application file for complete search history.

(56) References Cited

U.S. PATENT DOCUMENTS 5,678,863 A * 10/1997 Knight et al. ............... 283/113

(Continued)

FOREIGN PATENT DOCUMENTS

DE    39 42 663 A1    6/1991

(Continued)

*Primary Examiner*—Melvin Mayes
(74) *Attorney, Agent, or Firm*—Oliff & Berridge, PLC

(57) ABSTRACT

The present invention provides a discrimination medium A for discriminating the authenticity of an article by providing an optically discriminating mark on the article. A film 20 having a light reflecting layer of a polymer cholesteric liquid crystal having a circular polarization light selectivity for reflecting a specific circular polarization light is fixed to a part of the surface of a support 10. A printed portion is made by printing on the portions other than the film 20 of the support 10 in substantially the same color as that shown when the film 20 is viewed from the front. The discrimination medium A appears to be red at the support 10 and the film 20 when viewed from the front (although the film has a metallic luster), but at a larger viewing angle, the film 20 changes to blue by the blue-shift of the polymer cholesteric liquid crystal so as to exhibit a color different from that of the support 10.

7 Claims, 3 Drawing Sheets

U.S. PATENT DOCUMENTS

| | | | |
|---|---|---|---|
| 6,061,122 A * | 5/2000 | Hoshino et al. | 356/71 |
| 6,301,047 B1 * | 10/2001 | Hoshino et al. | 359/566 |
| 6,628,439 B2 * | 9/2003 | Shiozawa et al. | 359/2 |
| 6,740,431 B2 * | 5/2004 | Hoshino et al. | 283/83 |
| 6,875,481 B2 * | 4/2005 | Nishimura | 428/1.1 |
| 6,951,692 B1 * | 10/2005 | Das et al. | 428/690 |
| 2004/0151880 A1 * | 8/2004 | Nakamura et al. | 428/195.1 |
| 2005/0118396 A1 * | 6/2005 | Isherwood et al. | 428/164 |
| 2006/0097514 A1 * | 5/2006 | Nishimura et al. | 283/90 |

FOREIGN PATENT DOCUMENTS

| | | |
|---|---|---|
| EP | 0 911 758 A2 | 4/1999 |
| EP | A 028 359 A1 | 8/2000 |
| JP | A 04-144796 | 5/1992 |
| JP | A 8-115051 | 5/1996 |
| JP | A 09-068926 | 3/1997 |
| JP | A 2000-293108 | 10/2000 |
| JP | A 2000-318399 | 11/2000 |
| JP | A 2001-133566 | 5/2001 |
| JP | A 2001-141577 | 5/2001 |
| WO | WO 00/13065 | 3/2000 |

* cited by examiner

IDENTIFYING MEDIUM AND IDENTIFYING METHOD FOR OBJECT

TECHNICAL FIELD

The present invention relates to a discrimination medium for determining whether two-dimensional articles such as packages in which goods are packed, passports, cards, bills, exchange tickets for money, bonds, security notes, gift certificates, pictures, tickets, public game voting tickets, etc. are authentic, and for determining various kinds of three-dimensional articles are authentic.

BACKGROUND ART

Conventionally, for example, a technique of pasting a hologram on a surface of an article or a technique of applying special ink on a surface of an article have been known as methods for anti-falsification of articles such as cards and security notes. In a technique in which the hologram is used, the authenticity of the article on which the hologram is pasted is determined by viewing the hologram, which appears to be three-dimensional or varies in color depending on the viewing angle. In a technique in which the special ink is used, for example, fluorescent ink or magnetic ink may be used as the special ink. The authenticity of the article on which the above ink is applied is determined by sensing information hidden in the above ink by irradiating ultraviolet light thereon or by magnetic sensors although the above ink may be viewed in the same manner as normal inks.

However, the above falsification techniques have become more sophisticated as hologram manufacturing techniques have come into wide use, it is easy to falsify the hologram, and the falsified hologram cannot thereby be distinguished from an authentic one. In addition, since it is easy to obtain inks similar to the fluorescent ink or the magnetic ink, it is easy to falsify the ink, and a device for sensing information hidden in the above ink is very large and requires a power supply. Due to this, it is difficult to employ the technique using the above ink.

A technique in which a seal having a reflecting layer composed of a cholesteric liquid crystal is adhered on an article is disclosed in Japanese Unexamined Patent Application Publication No. 4-144796. The cholesteric liquid crystal has a circular polarization light selectivity, has metallic luster, and varies in color depending on the viewing angle (blue shift), and is thereby anticipated as a medium for distinguishing articles. However, in the conventional technique, the entire medium is composed of the cholesteric liquid crystal and equally thereby exhibits blue shift. Due to this, there is nothing therearound which the medium of the cholesteric liquid crystal may be compared therewith in color, and only sensory judgment of the authenticity of the article can thereby be performed, and it is thereby difficult to distinguish. As a result, it is difficult to reliably confirm the authenticity of an article by simply viewing the article from one direction. In addition, since the entire discrimination medium is composed of the cholesteric liquid crystal, the manufacturing cost is greatly increased. Alternatively, there is a case of pasting a seal on a package in which articles such as goods are packed. However, if packages discarded by a user are stolen, falsified goods packed in the stolen packages may be sold, or if a seal is peeled off from a package, falsified goods packed in another package on which the stolen seal is pasted may be sold.

Therefore, objects of the present invention are to provide a discrimination medium which can prevent falsification, facilitates determining the authenticity of the articles reliably and enables reduction in the manufacturing cost, and to provide a discrimination method using the same.

DISCLOSURE OF THE INVENTION

The present invention provides a discrimination medium for determining the authenticity of an article by providing an optically distinguishable mark on the article, comprising: a support; a film fixed at a part of a surface of the support, the film having a light reflecting layer composed of a polymer cholesteric liquid crystal having a circular polarization light selectivity for reflecting a specific circular polarization light; and a printed portion printed at a part of the support's surface other than the film, the printed portion having substantially the same color as that shown when the film is viewed from a predetermined direction.

The fundamental principle of the present invention will be described hereinafter. FIG. 1 schematically shows a structure of a cholesteric liquid crystal. The cholesteric liquid crystal has a layered structure. The molecular long axial directions of the respective layers of the layered structure are parallel to each other and are parallel to the plane thereof. The respective layers are rotated slightly with respect to the adjacent layer so as to be stacked, and the cholesteric liquid crystal thereby has a three-dimensional spiral structure. Assuming that pitch P is a distance needed when a direction factor of the molecular long axis direction is rotated through 360 degrees and is restored to an initial state and an average refractive index of the respective layers is index N, the cholesteric liquid crystal selectively reflects specific circular polarization light having a center wavelength $\lambda s$ satisfying the equation $\lambda s = N \times P$ (circular polarization light selectivity). Therefore, as shown in FIG. 2, when the molecular long axis direction of the respective layers of the cholesteric liquid crystal is rotated in a clockwise direction with respect to incident light, right-handed circular polarization light having a center wavelength $\lambda s$ is reflected by the cholesteric liquid crystal as it is, and left-handed circular polarization light passes though the cholesteric liquid crystal. On the other hand, all light other than the left-handed circular polarization light passes through the cholesteric liquid crystal. For example, cholesteric liquid crystal reflecting light of a red center wavelength $\lambda s$ may be placed on a material, which is absorbing visible light, such as a black sheet. When the cholesteric liquid crystal on the material is exposed to random polarization light such as sunlight, only right-handed circular polarization light of a center wavelength $\lambda s$ is reflected by the cholesteric liquid crystal, light transmitted thorough the cholesteric liquid crystal is absorbed by the black sheet, and the cholesteric liquid crystal thereby appears to be clearly red.

The cholesteric liquid crystal changes color depending on the view angle. When incident light obliquely enters into the cholesteric liquid crystal, the apparent pitch P decreases, and the center wavelength $\lambda s$ is thereby short. For example, the color of light, which is reflected by the cholesteric liquid crystal which has a red color when incident light entering perpendicularly thereto is observed, shifts to orange, yellow, green, blue-green, and blue in turn (blue shift).

According to the discrimination medium for determining the authenticity of an article of the present invention, the film having a light reflecting layer composed of a polymer cholesteric liquid crystal having in turn a circular polarization light selectivity of reflecting a specific circular polarized light is fixed at a part of a surface of the support and a printed portion is printed at a part of the support's surface other than the film having substantially the same color as that shown when the film is viewed from a predetermined direction, whereby the film reflects a specific circular polarization light, and the surroundings of the film, that is, the printed portion reflects random polarization light. As a result, the color of the film changes by the blue shift and the color of the surroundings do not change at a larger viewing angle, whereby the film gradually stands out from the surroundings, although the film has substantially the same color as the surroundings and the border between the film and the surroundings is not very obscure when the discrimination medium is viewed from a predetermined direction. Therefore, anyone can easily and reliably distinguish the discrimination medium by viewing. A part of the discrimination medium is composed of the cholesteric liquid crystal, whereby the manufacturing cost can be reduced.

In the present invention, the discrimination medium can be distinguished more reliably by using optical filters. That is, the discrimination medium of the present invention can be viewed via a first filter and a second filter so as to distinguish the article. The first filter can allow only circular polarization light having the same polarization direction as circular polarization light from the light reflecting layer to pass therethrough. The second filter can allow circular polarization light having a polarized direction opposite to the circular polarization light from the light reflecting layer to pass therethrough. In this case, when the article on which the discrimination medium is provided is viewed via the first filter, the part other than the film can reflect random polarization light, whereby the color of the printed portion can be observed. In the film, only a specific circular polarization light (for example, right-handed circular polarization light) can pass through the first filter, only the specific wavelength light of the specific circular polarization light can be reflected by the light reflecting layer of the film, and can pass through the first filter again, whereby the film can be observed more clearly via the first filter and can stand out with respect to the printed portion therearound. When the view angle is larger, the cholesteric liquid crystal can turn to a different color from the surroundings by the blue shift. In addition, since the second filter does not allow circular polarization light having the same polarization direction as circular polarization light from the light reflecting layer to pass therethrough, the cholesteric liquid crystal appears brack via the second filter and the surroundings have the color of the printed portion.

On the other hand, when, for example, ink is printed instead of the film, random polarization natural light reflects thereon, circular polarization light of random polarization natural light, which have the same polarization direction as circular polarization light from the reflecting layer, can pass through the first filter, and circular polarization light polarized in a direction opposite to the circular polarization light from the light reflecting layer can pass through the second filter. These circular polarization lights are composed of light of every wavelength, and right-handed and left-handed circular polarization lights are included by almost the same amount. Therefore, the same article can be observed via the first filter and the second filter, and the article can be confirmed as a fake.

When a discrimination mark, which is composed of the cholesteric liquid crystal film having circular polarization light selectivity opposite to that of the authentic discrimination mark, is formed, the cholesteric liquid crystal film and the surroundings therearound can be viewed via the first filter and the second filter in the opposite manner to that of the above case. That is, the cholesteric liquid crystal can appear black and the surroundings can appear to be the printed color since the surroundings reflects random polarization light. In the second filter, the film can be observed more clearly than the surroundings, and when the view angle is larger, the film can be observed differently by the blue shift. Therefore, in this case, the article can be distinguished as being falsified one.

In the discrimination medium of the present invention, the film of the cholesteric liquid crystal can be cut in a predetermined shape and may be arranged on the support, whereby the film can have a predetermined pattern portion, a predetermined figure portion or a predetermined character portion. The discrimination medium of the present invention further may comprise a hologram formed by embossing the surface or the rear face of the film.

According to the present invention, it is difficult to falsify the discrimination medium. That is, since the cholesteric liquid crystal having substantially the same color as the printed portion printed on the support needs to be copied, be cut, and be arranged on the support so as to have a predetermined shape, it is very difficult to falsify the discrimination medium. In addition, in order to prevent falsification, the following example can be applied to the present invention.

For example, the discrimination medium may further comprise: an adhesive provided on the rear face of the support so that the support is pasted on the article via the adhesive; and a gap so that the discrimination medium tears when the support is detached from the article. In addition, the discrimination medium may further comprise: an adhesive provided on the rear face of the support so that the support is pasted on the article via the adhesive, wherein a part of the adhesive remains adhered on the article when the support is detached from the article, whereby the remaining part of the adhesive on the article shows that the support has been detached from the article. For example, a message such as "opened" may be visible on the discrimination medium. According to the present invention, it is impossible to peel off the discrimination medium from a discarded package in order to use the discrimination medium.

BEST MODE FOR CARRYING OUT THE INVENTION

Figure 1:
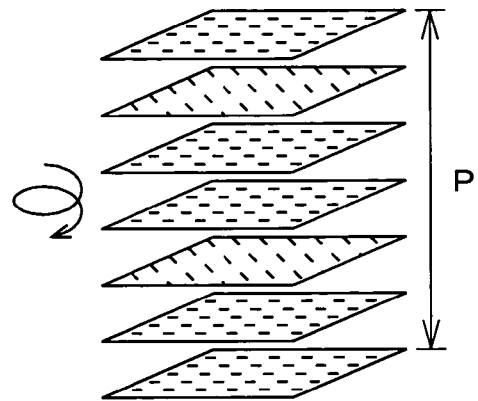
FIG. 1 is a perspective diagram showing a cholesteric liquid crystal for explaining a principle of the present invention.
Figure 2:
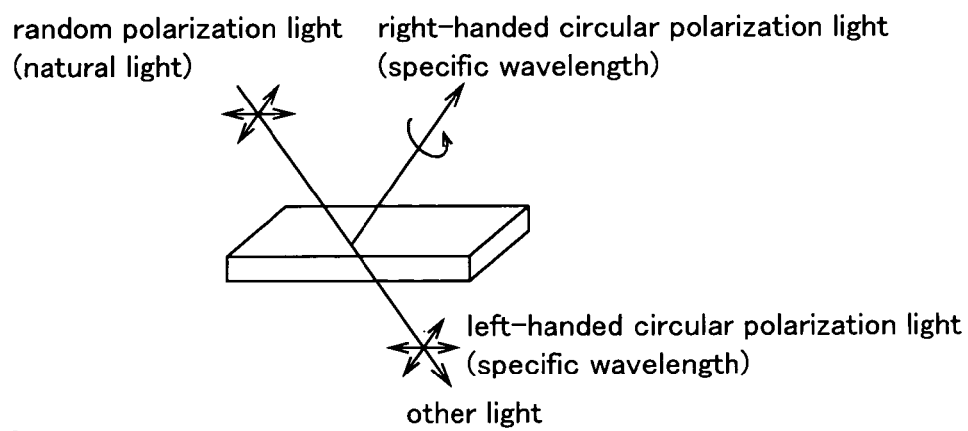
FIG. 2 is a perspective diagram showing a circular polarization light reflected on the cholesteric liquid crystal.

An embodiment will be explained hereinafter.

A polymer cholesteric liquid crystal can be manufactured by methods described in, for example, Japanese Unexamined Patent Application Publication No. 63-51193, Japanese Unexamined Patent Application Publication No. 57-165480, and Japanese Unexamined Patent Application Publication No. 58-17119. For example, low molecular cholesteric liquid crystal is dissolved and maintained in a polymerized monomer, whereby cholesteric liquid crystals grow. The low molecular cholesteric liquid crystals are joined by photoreaction or thermal reaction. As a result, the molecular orientation thereof is fixed and the low molecular cholesteric liquid crystals are formed into a polymer thereof. Alternatively, thermo-tropic polymer liquid crystal of branched-chain type or straight-chain type may be heated above the transition point thereof so that a cholesteric liquid crystal structure thereof may grow, and may be then cooled to a temperature below the transition point thereof so that the molecular orientation thereof may be fixed. Alternatively, lyotropic liquid crystal of the branched-chain type or straight-chain type may be oriented in a solvent in a cholesteric orientation, and the solvent is gradually volatilized so that molecular orientation thereof is fixed.

For example, a branched-chain type polymer having a liquid crystal forming group in a branched-chain such as acrylic resin, polymethyl methacrylate, polysioxane, polymeronate and a straight-chain type polymer having liquid crystal forming group in a branched-chain such as polyester, polyester amide, polycarbonate polyamide and polyimide may be mentioned as a polymer cholesteric liquid crystal.

The above polymer cholesteric liquid crystal can be produced by coating raw material liquid on one side of a thin plastic film (for example, polyethylene terephthalate (PET) film) having a peeling layer and fixing cholesteric orientation and molecular orientations, and so on. In this case, the polymer cholesteric liquid crystal has equal torsion pitch P extending in a layered direction thereof and has a thickness of 0.5 to 5.0 μm. Black heat seal (thermal fusion adhesive) is coated on the polymer cholesteric liquid crystal and is slit into a film having 1 to 5 mm thickness by a micro-slitter.

A support can be composed of polypropylene, polyester, PET, TAC (triacetylcellulose), and a sheet. A printed portion having substantially the same color (for example, red) as the film when viewed from the front thereof is printed on the support, the above film is positioned on the printed portion, and the heat seal is heated on the film so as to fix the film. The plastic film is peeled off so that the cholesteric liquid crystal film is exposed. The black heat seal is used in order to absorb light passing through the polymer cholesteric liquid crystal. A thin overcoat layer may be provided between the plastic film and the polymer cholesteric liquid crystal and is exposed on the surface after peeling off the plastic film.

Figure 3:
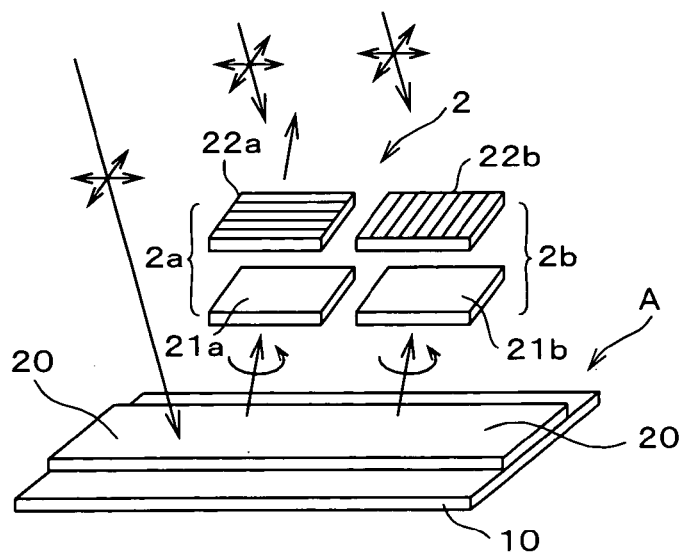
FIG. 3 a perspective diagram showing a discrimination medium and a circular polarization light filter.

FIG. 3 is a schematic diagram showing a method of discriminating an article by using a discrimination medium A having a support 10 and a film 20 of a cholesteric liquid crystal which is fixed at the support 10 in the above manner, and a circularly polarization light filter 2. Although the support 10 and the film 20 appear to be red when viewed from the front of the discrimination medium A, the color of the film 20 changes to blue at a larger viewing angle. The circular polarized light filter 2 has a first filter 2a allowing only right-handed circular polarization light to pass therethrough and a second filter 2b allowing only left-handed circular polarization light to pass therethrough. The first filter 2a has a wave plate 21a and a polarization plate 22a. The second filter 2b has a wave plate 21b and a polarization plate 22b. The polarization plates 22a and 22b allow light having a specific wave direction to pass therethrough so as to change the light into linearly polarized light. The wave plates 21a and 21b shift phase of part of the linearly polarized light by quarter wavelength thereof so as to change the linearly polarized light to the circular polarization light. In this embodiment, light entering from the polarization plate 22a changes from the light linearly polarized by the first filter 2a to right-handed circular polarization light. On the other hand, light entering from the polarization plate 22a changes from the light linearly polarized by the second filter 2b to left-handed circular polarization light. The wave plates 21a and 21b change circular polarization light entering thereinto to linearly polarized light and change linearly polarized light entering thereinto to circular polarization light.

In the right-handed circular polarization light exiting from the first filter 2a, the component of the wavelength thereof depending on the pitch is reflected by the film 20, and enters into the first filter 2a again remaining the right-handed circular polarization light. The right-handed circular polarization light is converted by the first filter 2a to the linearly polarized light and exits therefrom. Since the random polarization light is reflected by the surface of the support 10, the right-handed circular polarization light thereof passes through the first filter 2a and the printed portion thereby appears to be red, for example. In the film 20, only the right-handed circular polarization light passes through the first filter 2a, and for example, the red wavelength light thereof is reflected by the light reflecting layer of the film 20 and passes through the first filter 2a again. As a result, the film 20 appears to be more distinct when viewed via the first filter 2a and the film stands out against the surrounding printed portion. The choresteric liquid crystal exhibits the blue shift so that the film 20 appears to be a different color from the surroundings thereof. The film 20 appears to be black when viewed via the second filter 2b since the second filter 2b does not pass through the circular polarization light having the same polarization direction as circular polarization light from the light reflecting layer and the surroundings thereof appears to be red since the random polarization light is reflected on surroundings thereof. Therefore, the article can be distinguished as an authentic one based on the above appearance of the discrimination medium A which is different between via the first filter 2a and via the second filter 2b.

On the other hand, when, for example, ink is printed instead of the film 20, random polarization natural light is reflected thereby, circular polarization light of random polarization natural light, which have the same polarization direction as circular polarization light from the reflecting layer, passes through the first filter 2a, and circular polarization light polarized in a direction opposite to the circular polarization light from the light reflecting layer passes through the second filter 2b. These circular polarization lights are composed of light of all wavelengths, and right-handed and left-handed circular polarization light are included in almost the same amount. Therefore, the same article can be observed via the first filter 2a and the second filter 2b, and the article can be confirmed as being a fake.

When discrimination medium A composed of the cholesteric liquid crystal film 20 having circular polarization light selectivity opposite to the austenitic one is formed, the cholesteric liquid crystal film and the surroundings therearound can be viewed via the first filter 2a and the second filter 2b in an opposite manner to that of the above case. That is, the cholesteric liquid crystal can appear to be black and the surroundings can be observed in the printed color since the surroundings reflect random polarization light. In the second filter 2b, the film 20 can be observed more clearly than the surroundings, and when the view angle is larger, the film can be observed differently by the blue shift. Therefore, in this case, the article can be distinguished as a fake one.

The manufacturing method of the above discrimination medium A will be explained hereinafter with reference to FIGS. 4A to 4C. As shown in FIG. 4B, the support 10 is equipped with a substrate 11 of a PET film, an adhesive layer 12 layered on the rear face of the substrate 11, a peeling sheet 13 layered on the rear face of the adhesive layer 12 and a red printed layer 14 layered on the surface of the substrate 11. As shown in FIG. 4C, the film 20 is equipped with a peeling layer 22, a polymer cholesteric liquid crystal layer 23 and a black heat seal layer 24 which are layered in turn on a rear face of a substrate 21. The film 20 has a belt-like body of a few mm in width.

Figure 4A:
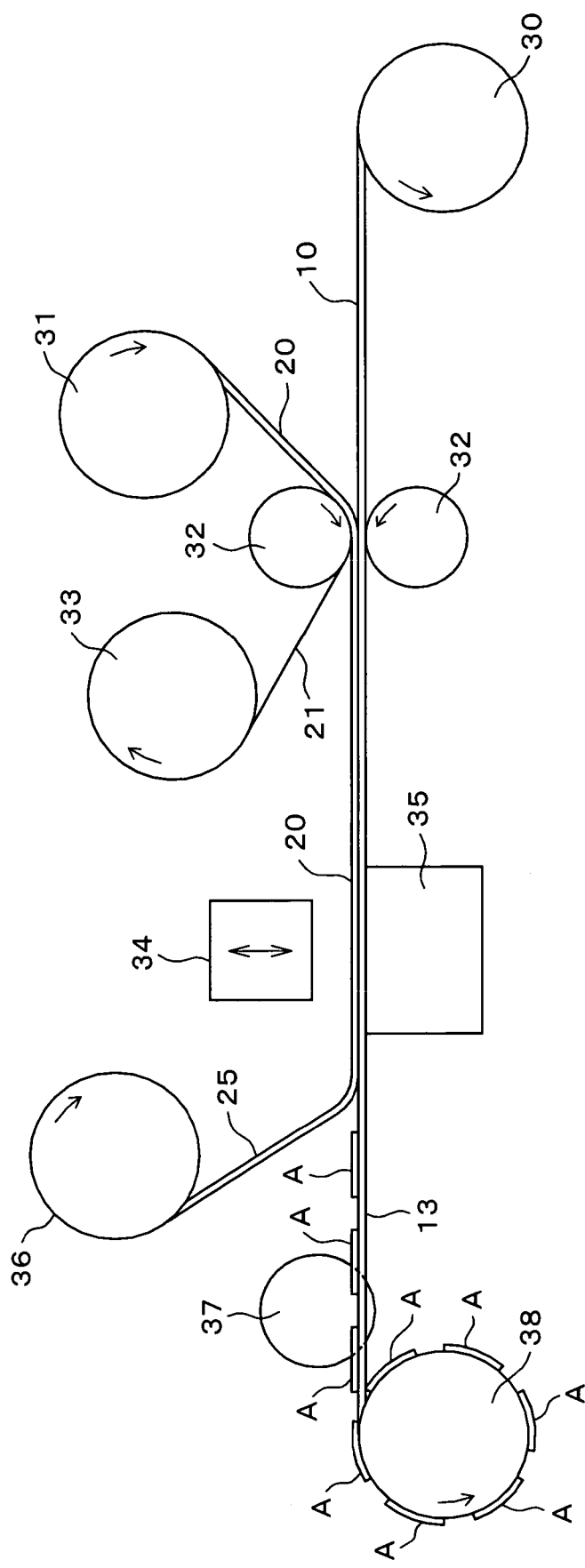
FIG. 4A is a side view showing a manufacturing device for the discrimination medium of an embodiment according to the present invention.
Figure 4B:
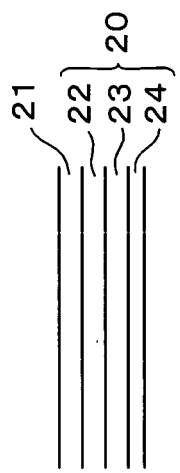
FIG. 4B is a cross sectional diagram showing details of a support.
Figure 4C:
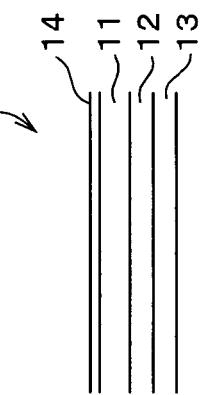
FIG. 4C is a cross sectional diagram showing details of a film.

As shown in FIG. 4A, reference numeral 30 denotes a first roller for rolling the support 10, 31 denotes a second roller for rolling the film 20. Plural second rollers 31 are located in a width direction which is perpendicular to a sheet. The support 10 and the film 20 are fixed to each other by melting the heat seal layer 24 with a thermo compression bonding roller 32. Next, the substrate 21 is peeled from the film 20 and is rolled by a first rolling roller 33.

Next, the film 20 is cut in half by metallic molds 34 and 35 so as to have the peeling sheet 13 of the support 10 and to have a predetermined length. The part 25 other than the discrimination mediums A, which has the support 10 and the film 20 and which is cut in a rectangular shape thereafter, is then rolled by a second rolling roller 36. Next, the discrimination mediums A are cut by a slitter 37 among each other and are rolled separately as a belt by a third rolling roller 38. The third rolling roller 38 rolling and have the discrimination mediums A is mounted to a mounting device as it is, and the discrimination mediums are pasted onto article packages mechanically.

Figure 5:
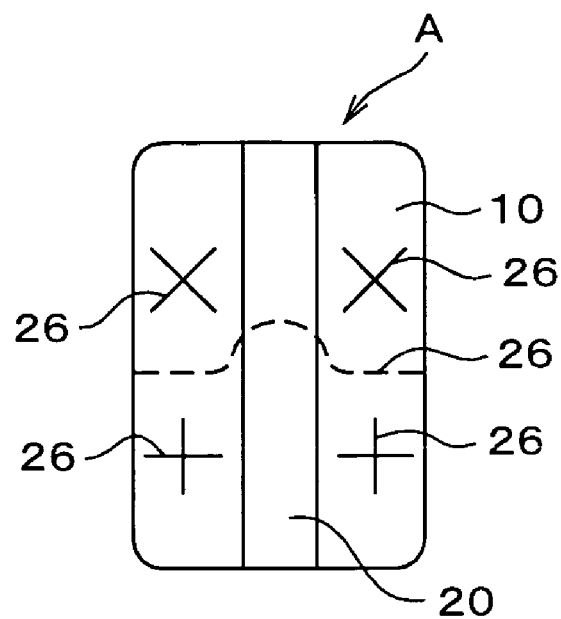
FIG. 5 is a plane view showing a discrimination medium in which a gap is provided.
Figures 6A, 6B:
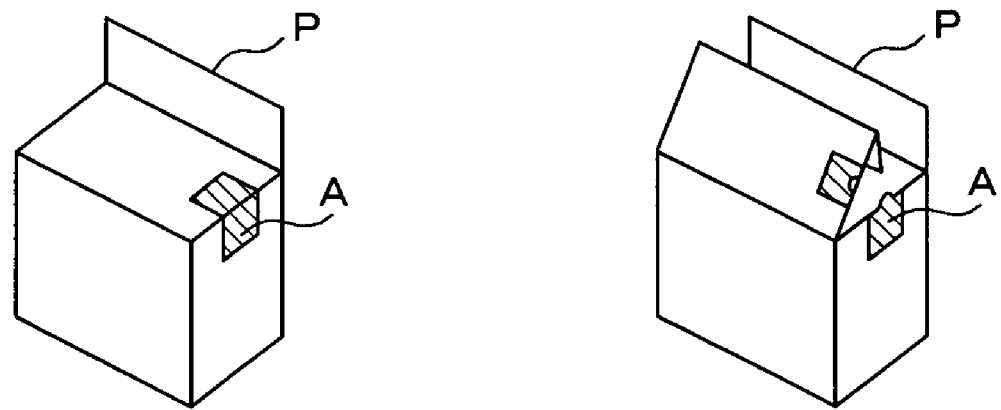
FIG. 6A is a perspective view showing a state in which the discrimination medium is pasted on a package.
FIG. 6B is a perspective view showing a state in which the package is opened.

As shown in FIG. 5, when the discrimination mediums A are cut in half by the metallic molds 34 and 35, gaps 26 can be formed on the discrimination mediums A. In a case in which the discrimination medium A is pasted onto the corner of the package P as shown in FIG. 6A, the discrimination medium A is torn at the gap 26 as shown in FIG. 6B and cannot thereby be reused when the package P is opened. When the discrimination medium A is detached from the package P, the discrimination medium A is also torn at the gap 26.

According to the discrimination medium of the present invention as described above, the film, which has a light reflecting layer composed of a polymer cholesteric liquid crystal having a circular polarization light selectivity of reflecting a specific circular polarization light, is fixed at a part of the surface of the support, and the printed portion, which has substantially the same color as that shown when the film is viewed from the front thereof, is printed at a part of the support's surface other than the film, whereby the discrimination medium can prevent falsification, can be easily and reliably visually distinguished, and the manufacturing cost can be reduced.

The invention claimed is:

1. A discrimination method for determining the authenticity of an article by providing an optically discriminating mark having a figure portion or a character portion on the article, the discrimination method comprising steps of:

fixing a film at part of the surface of a support, the film having a light reflecting layer composed of a polymer cholesteric liquid crystal having a circular polarization light selectivity for reflecting a specific circular polarization light;

making the film smaller than the support;

printing a printed portion at another part of the support's surface in substantially the same color as a color of the film when the film is viewed from a predetermined direction, the another part being other than the part at which the film is fixed;

providing the support to the article as the discriminating mark; and viewing the discriminating mark via a first filter and a second filter, the first filter allowing only predetermined circular polarization light having a same polarization direction as circular polarization light from the light reflecting layer to pass therethrough, the second filter allowing circular polarization light having a polarized direction opposite to the predetermined circular polarization light from the light reflecting layer to pass therethrough, wherein the discriminating mark is viewed via the first filter, the color of the printed portion is not changed regardless of a change of the view angle, and the color of the film is changed by blue shift of a color of the light reflecting layer in accordance with the change of the view angle, and wherein the discriminating mark is viewed via the second filter, the color of the printed portion is not changed regardless of the change of the view angle, and the color of the film is black regardless of the change of the view angle, so that the authenticity of the article is determined.

2. A discrimination medium for determining the authenticity of an article by providing an optically discriminating mark on the article, comprising:

a support;

a film fixed at a part of a surface of the support, the film having a light reflecting layer composed of a polymer cholesteric liquid crystal having a circular polarization light selectivity of reflecting a specific circular polarization light;

a printed portion at another part of the support's surface, the another part being other than the part at which the film is fixed;

an adhesive provided on a rear face of the support so that the support is pasted on the article via the adhesive, the rear face being opposite to the surface; and a gap formed on the support for allowing the discrimination medium to tear when the support is detached from the article, wherein the printed portion has substantially the same color as a color of the film when the film is viewed from a predetermined direction, the color of the printed portion is not changed regardless of the change of the view angle, and the color of the film is changed by blue shift of a color of the light reflecting layer in accordance with the change of the view angle.

3. The discrimination medium according to claim 2, wherein the film has plural portions cut in a predetermined shape and the plural portions of the film are arranged on the support, whereby the film has a predetermined pattern portion, a predetermined figure portion, or a predetermined character portion.

4. The discrimination medium according to claim 2, the discrimination medium further comprising:

a hologram formed by executing embossing of the surface or the rear face of the film, the rear face being opposite to the surface.

5. A discrimination medium for determining the authenticity of an article by providing an optically discriminating mark on the article, comprising:
   a support;
   a film fixed at a part of a surface of the support, the film having a light reflecting layer composed of a polymer cholesteric liquid crystal having a circular polarization light selectivity of reflecting a specific circular polarization light;
   a printed portion at another part of the support's surface, the another part being other than the part at which the film is fixed; and
   an adhesive provided on a rear face of the support so that the support is pasted on the article via the adhesive, the rear face being opposite to the surface,
   wherein the printed portion has substantially the same color as a color of the film when the film is viewed from a predetermined direction, the color of the printed portion is not changed regardless of the change of the view angle, and the color of the film is changed by blue shift of a color of the light reflecting layer in accordance with the change of the view angle,
   wherein a part of the adhesive remains adhered on the article when the support is detached from the article, whereby the remaining part of the adhesive on the article shows that the support has been detached from the article.

6. The discrimination medium according to claim 5, wherein the film has plural portions cut in a predetermined shape and the plural portions of the film are arranged on the support, whereby the film has a predetermined pattern portion, a predetermined figure portion, or a predetermined character portion.

7. The discrimination medium according to claim 5, the discrimination medium further comprising:
   a hologram formed by executing embossing of the surface or a rear face of the film, the rear face being opposite to the surface.

* * * * *